(12) United States Patent
Liu

(10) Patent No.: US 11,124,265 B1
(45) Date of Patent: Sep. 21, 2021

(54) CLIPLESS PEDAL

(71) Applicant: Ya-Hsin Liu, Taichung (TW)

(72) Inventor: Ya-Hsin Liu, Taichung (TW)

( * ) Notice: Subject to any disclaimer, the term of this patent is extended or adjusted under 35 U.S.C. 154(b) by 0 days.

(21) Appl. No.: 17/141,242

(22) Filed: Jan. 5, 2021

(51) Int. Cl.
*B62M 3/08* (2006.01)
(52) U.S. Cl.
CPC .................. *B62M 3/086* (2013.01)
(58) Field of Classification Search
CPC ..................................................... B62M 3/086
See application file for complete search history.

(56) References Cited

U.S. PATENT DOCUMENTS

| 6,070,493 A * | 6/2000 | Chen ...................... B62M 3/086 74/594.4 |
| 2007/0193402 A1 * | 8/2007 | Hsieh ..................... B62M 3/086 74/560 |
| 2009/0235778 A1 * | 9/2009 | Chen ...................... B62M 3/086 74/594.6 |

* cited by examiner

*Primary Examiner* — Vicky A Johnson
(74) *Attorney, Agent, or Firm* — Karin L. Williams; Alan D. Kamrath; Mayer & Williams PC

(57) ABSTRACT

A clipless pedal includes a pedal body having a tubular part mounted to an axle. The tubular part divides the pedal body into a first portion and a second portion. A tongue extends from the inside of the first portion. A board is formed between the tubular part and the inside of the second portion of the pedal body. A clip is connected to the pedal body and includes a base and an engaging which is connected to the base. The first end of the baes is fixed to the tongue by two first bolts from the top of the base. The second end of the base is fixed to the board by two second bolds which extend through the board and are connected to the underside of the second end of the base. The base of the clip can bear high torque applied to it.

6 Claims, 4 Drawing Sheets

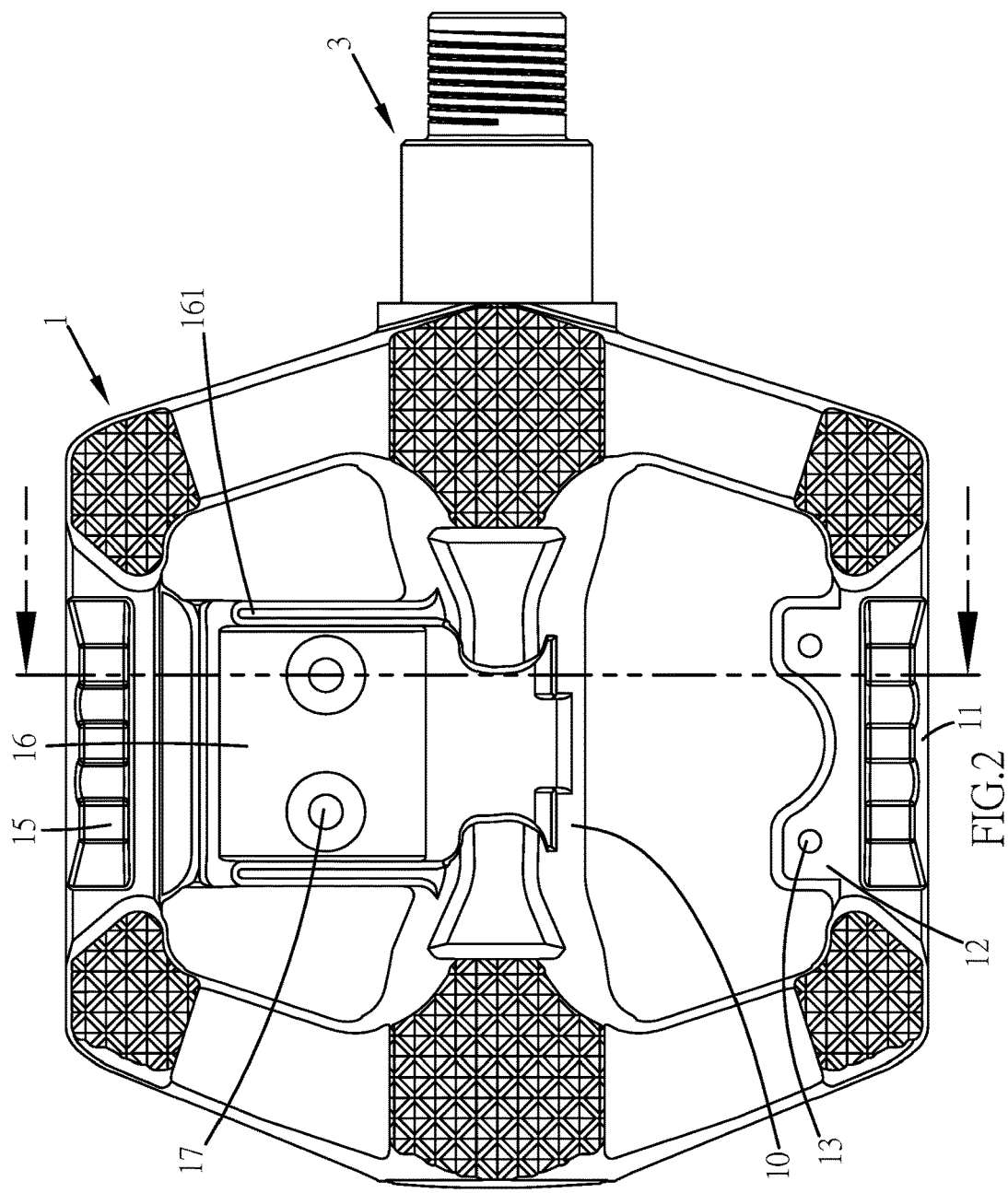
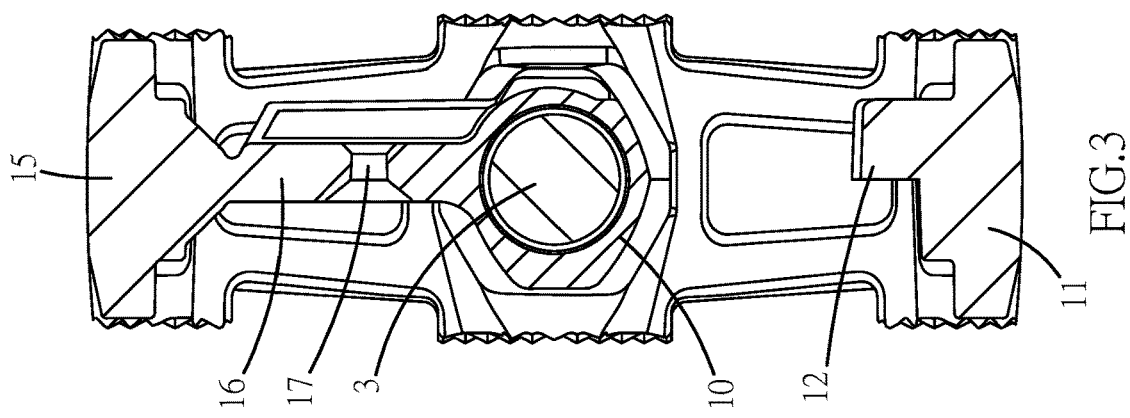

CLIPLESS PEDAL

BACKGROUND OF THE INVENTION

1. Fields of the Invention

The present invention relates to a clipless pedal for bicycles, and more particularly, to a clipless pedal that has strong structure to accept hard hit from the shoe cleat.

2. Descriptions of Related Art

The conventional clipless pedals includes a frame located at the center of the pedal, a pine extending through the frame, a stop located between the frame and the pin, a torsion spring mounted to the pin and biased between the stop and the frame, and an engaging member connected to the frame. The engaging member includes a body located beside the frame, multiple bores, a support portion extending from one end of the body, and a flange extending inward from the support portion. The cleat has one end thereof engaged with the flange so as to secure the shoe to the pedal.

When disengaging the clear from the pedal, the clear is moved slightly backward and then swings sideway. The clear is pivoted about the rear end of the clear and the flange, and the front end of the cleat moves horizontally. The front end of the clear pushes the flange upward counter clockwise until the front end of the cleat is disengaged from the flange. The shoe is then moved forward to completely disengage the rear end of the clear from the Y-shaped flange.

However, the flange is a Y-shaped part so that the two distal ends of the flange are cantilevered and contact two sides of the cleat. When disengaging the cleat from the flange, the rear end of the cleat contacts the flange with a significant pressure and pivots, so that the two distal ends of the Y-shaped flange may be broken by frequent operations. Once one of the two distal ends of the Y-shaped flange is broken, the user has to replace the whole pedal.

The present invention intends to provide a clipless pedal to eliminate the shortcomings mentioned above.

SUMMARY OF THE INVENTION

The present invention relates to a clipless pedal and comprises a pedal body having tubular part mounted to an axle and located at the central portion of the pedal body. The tubular part is located between a first portion and a second portion of the pedal body. A tongue extends from the inside of the first portion and extends toward the tubular part. The tongue includes threaded holes. A board is formed between the tubular part and the inside of the second portion of the pedal body. The board includes through holes. A clip includes a base and an engaging member. The base is connected to the pedal body, and a pin extends through a room of the base. A stop is movably mounted to the pin and located in the room. A torsion spring is mounted to the pin and biased between the inside of the room and the stop. The engaging member is connected to the top of the base. Two first bolts extend through sink holes defined through the first end of the base and are connected to the threaded holes of the tongue to connect the first end of the base to the tongue. Two second bolts extend through the through holes of the board and are connected to the underside of the second end of the base.

The primary object of the present invention is to provide a clipless pedal, wherein the first and second ends of the base are respectively fixed to the pedal body so that the clip can bear high torque and pressure applied to it.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 is a top view to show the pedal body of the clipless pedal of the present invention;

FIG. 3 is a side cross sectional view of the pedal body of the clipless pedal of the present invention;

DETAILED DESCRIPTION OF THE PREFERRED EMBODIMENT

Figure 1:
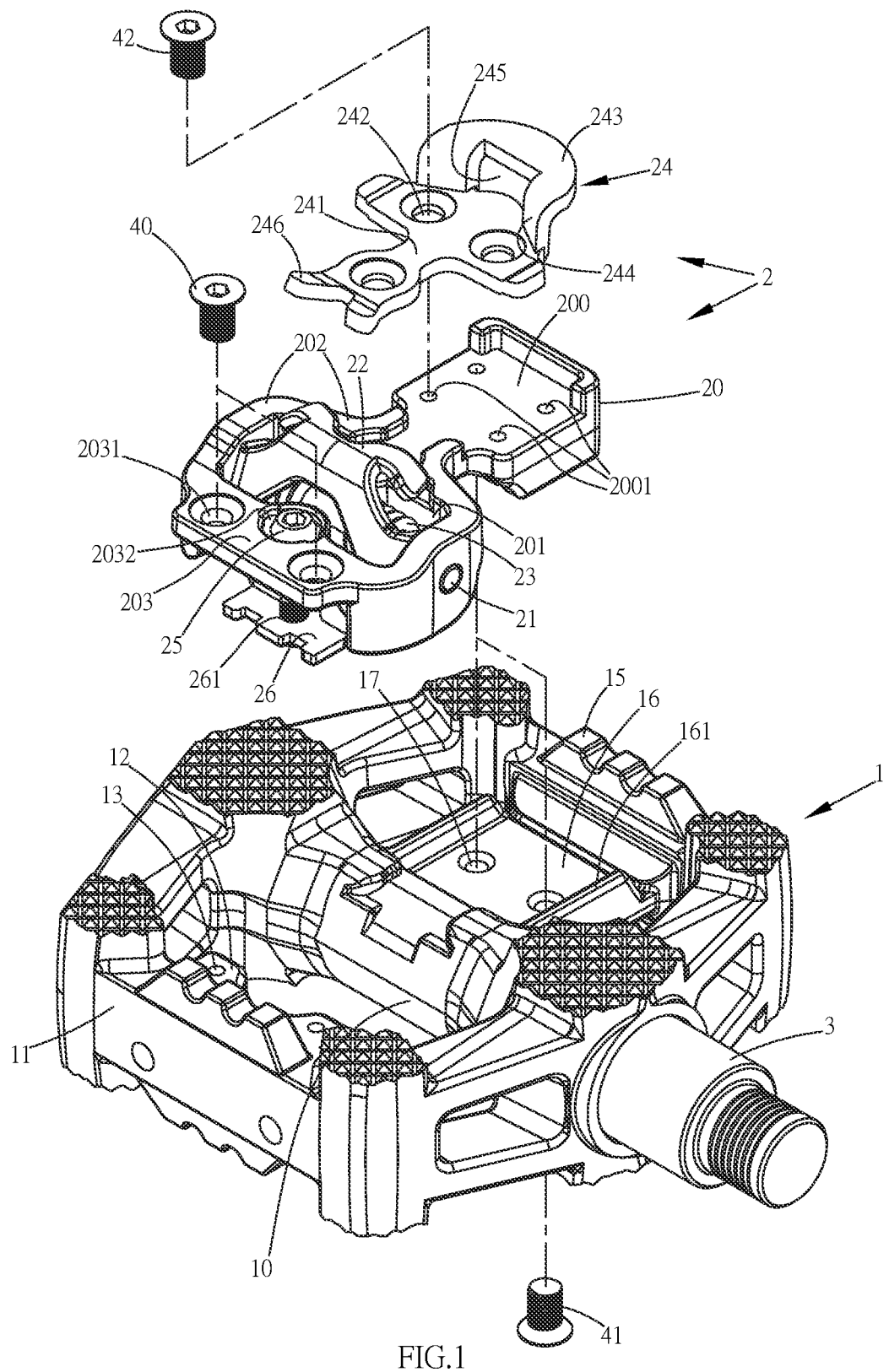
FIG. 1 is an exploded view of the clipless pedal of the present invention.

Referring to FIGS. 1 to 5, the clipless pedal for bicycles of the present invention comprises a pedal body 1 with tubular part 10 mounted to an axle 3, and a clip 2 that is connected to the pedal body 1.

The tubular part 10 is located at the central portion of the pedal body 1, so as to divide the tubular part 10 into a first portion 11 and a second portion 15. A tongue 12 extends from the inside of the first portion 11 and extends toward the tubular part 10. The tongue 12 includes two holes 13. A board 16 is integrally formed between the tubular part 10 and the inside of the second portion 15 of the pedal body 1. The board 16 includes two through holes 17. Preferably, the number of the through holes 17 of the board 16 is the same as the number of the threaded holes 13 of the tongue 12. The board 16 of the pedal body 1 includes two ridges 161 respectively extending from two sides of the board 16 so as to restrict movement of the base 20 of the clip 2 when the clip 2 is connected to the pedal body 1. Preferably, the through holes 17 are located between the two ridges 161.

The clip 2 includes a base 20 and an engaging member 24. The base 20 is connected to the pedal body 1. A pin 21 extends through a room 201 of the base 20. A stop 22 is movably mounted to the pin 21 and located in the room 201. A torsion spring 23 is mounted to the pin 21 and biased between the inside of the room 201 and the stop 22. The engaging member 24 is connected to the top of the base 20. Two first bolts 40 extend through the two sink holes 2031 defined through the first end of the base 20 and are connected to the threaded holes 13 of the tongue 12 to connect the first end of the base 20 to the tongue 12. Two second bolts 41 extend through the through holes 17 of the board 16 and are connected to the underside of the second end of the base 20. Therefore, the first and second ends of the base 20 are respectively fixed to the pedal body 1.

The engaging member 24 includes an elongate plate 241 which is connected to the base 20. Two bores 242 are defined through the plate 241. Two locking members 42 extend through the two bores 242 so as to connect the engaging member 24 to the base 20. Specifically, the base 20 includes a surface 200 which has multiple threaded holes 2001. The locking members 42 are connected to the threaded holes 2001 of the surface 200 from one direction (top). The second bolts 41 extend through the through holes 17 and are connected to the threaded holes 2001 of the surface 200 from a direction (underside of the board 16) opposite to the direction that the locking members 42 are connected to the surface 200, so that the base 20 is fixed between the engaging member 24 and the board 16 of the pedal body 1.

Two legs 244 extend from one of two ends of the plate 241 and a bridge 243 is formed between the two legs 244 so as to form an opening 245 between the two legs 244 and the bridge 243. The bridge 243 extends upward and inclinedly relative to the plate 241. The opening 245 is adapted to be engaged with a cleat (not shown). Two protrusions 246 extend upward from another one of the two ends of the plate 241. The two protrusions 246 extend toward the stop 22.

The room 201 of the base 20 is located next to the surface 200 and located between two side frames 202. A first extension 203 is located at the first end of the base 20 and is formed between the two side frames 202. Two sink holes 2031 and a receiving holes 2032 are defined through the first extension 203. The first bolts 40 extend through the sink holes 2031 and are connected to the threaded holes 13 of the tongue 12. An adjustable bolt 25 extends through the receiving holes 2032 and is threadedly connected to a threaded hole 261 that formed to the first end of the base 20 as shown in FIG. 1. Preferably, the threaded holes 2001 of the surface 200 and the sink holes 2031 are not located on a common line, so that the assemblers can easily put the first bolts 40, the second bolts 41 and the locking members 42 correctly from different positions and directions.

Figure 4:
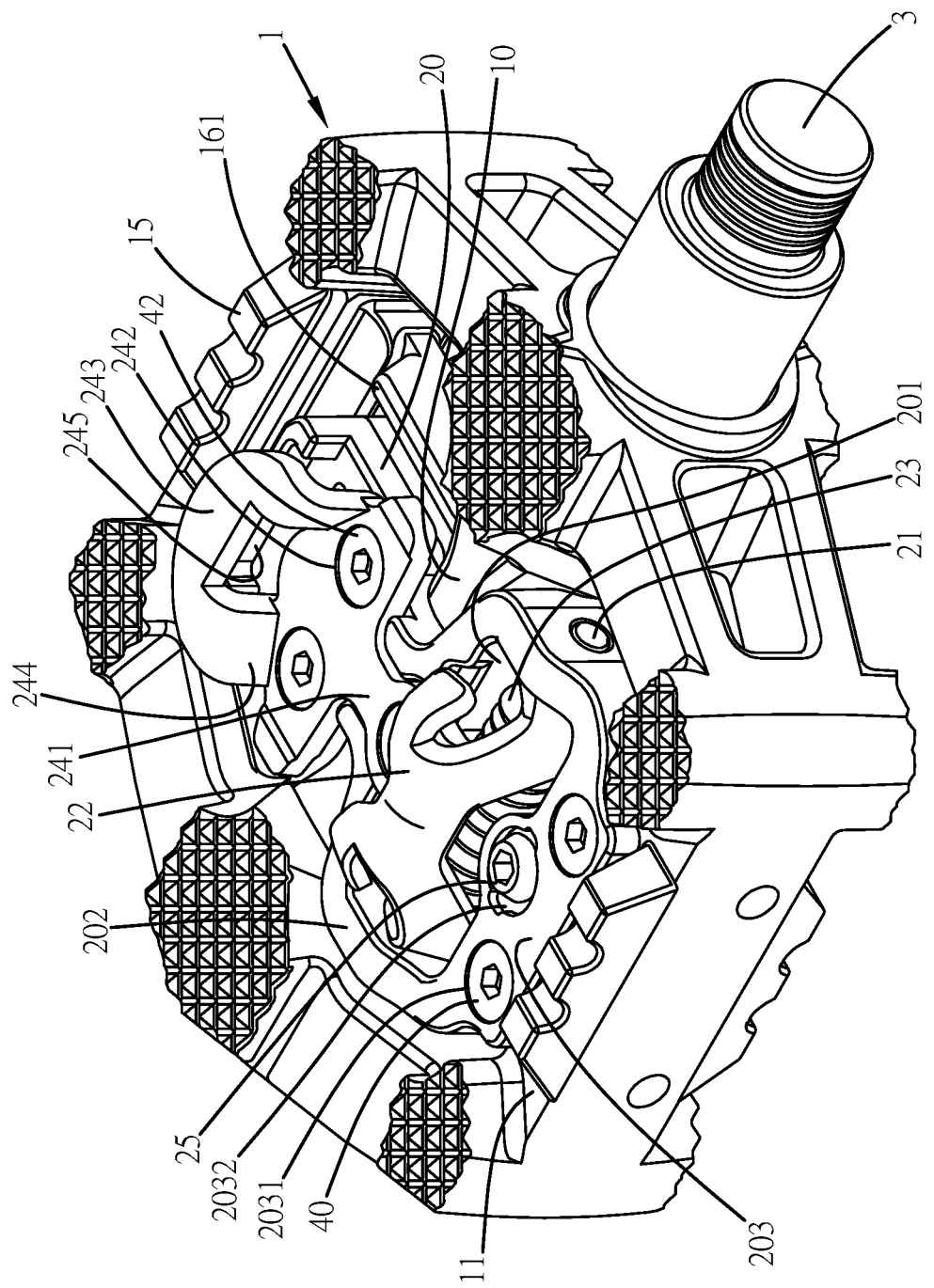
FIG. 4 is a perspective view to show the clipless pedal of the present invention.
Figure 5:
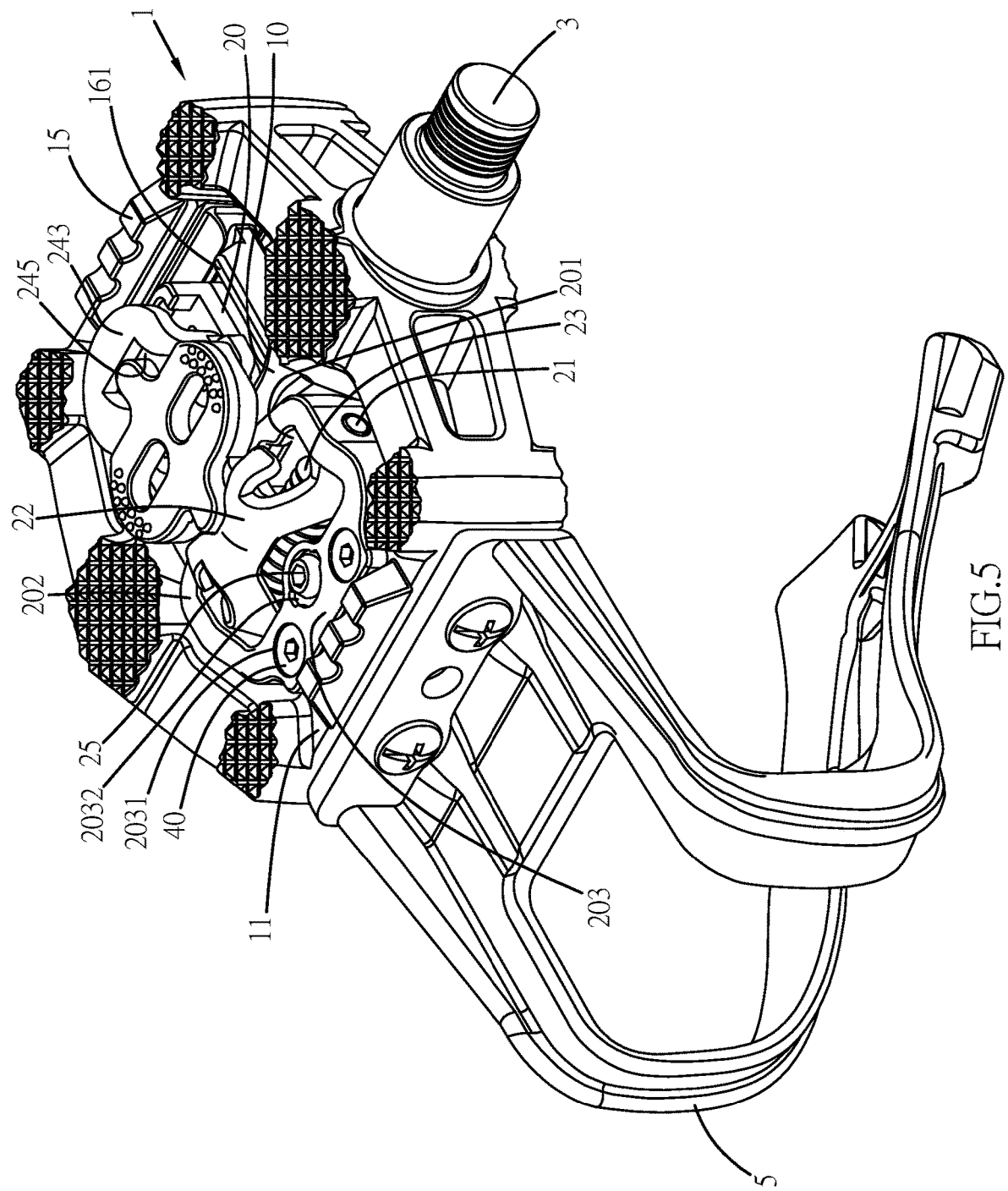
FIG. 5 shows that the clipless pedal of the present invention is connected with a strap.

When assembling, the clip 2 is put in the pedal body 1 and across the tubular part 10, so that the threaded holes 2001 of the surface 200 of the base 20 are located aligned with the through holes 17 of the board 16, and the sink holes 2031 of the first extension 201 are located aligned with the threaded holes 13 of the first portion 11 of the pedal body 1. The second bolts 41 extend through the through holes 17 from the underside of the board 16 and are connected to the threaded holes 2001 of the surface 200. The two first bolts 40 extend through sink holes 2031 in the first end of the base 20 and are connected to the threaded holes 13 of the tongue 12. Therefore, the first end and the second end of the base 20 are fixed to the pedal body 1. The middle portion of the base 20 is matched with the tubular part 20. The base 20 of the clip 2 are positioned to the pedal body 1, the distance between the front end to the middle portion of the base 20 and substantially equal to the distance from the second end to the middle portion of the base 20. Besides, the number of the through holes 17 of the board 16 is the same as the number of the threaded holes 13 of the tongue 12, the base 20 of the clip 2 is balanced and secured to the pedal body 1 as shown in FIGS. 4 and 5. Therefore, the torque and pressure applied to the base 20 of the clip 2 can be evenly distributed, and the pedal body 1 can have a longer life.

When maintaining or replacing parts, the first and second bolts 40, 41 are loosened, so that the clip 2 can be easily separated from the pedal body 1. As shown in FIG. 1, the actions to the first and second bolts 40, 41 are not interfered by the strap 5 connected to the pedal body 1 as shown in FIG. 5. When the maintenance is finished, the first and second bolts 40, 41 are then tightened, the new clip 2 can be quickly fixed to the pedal body 1 as shown in FIG. 4. It is obvious that the maintenance and replacement of parts of the clipless pedal of the present invention is easy and efficient.

While we have shown and described the embodiment in accordance with the present invention, it should be clear to those skilled in the art that further embodiments may be made without departing from the scope of the present invention.

What is claimed is:

1. A clipless pedal comprising:
a pedal body having tubular part mounted to an axle and located at a central portion of the pedal body, the tubular part located between a first portion and a second portion of the pedal body, a tongue extending from an inside of the first portion and extending toward the tubular part, the tongue including threaded holes, a board formed between the tubular part and an inside of the second portion of the pedal body, the board including through holes, and
a clip including a base and an engaging member, the base connected to the pedal body, a pin extending through a room of the base, a stop movably mounted to the pin and located in the room, a torsion spring mounted to the pin and biased between an inside of the room and the stop, the engaging member connected to a top of the base, two first bolts extending through sink holes defined through a first end of the base and being connected to the threaded holes of the tongue to connect the first end of the base to the tongue, two second bolts extending through the through holes of the board and being connected to an underside of a second end of the base, such that the first and second ends of the base are respectively fixed to the pedal body.

2. The clipless pedal as claimed in claim 1, wherein a number of the through holes of the board is the same as a number of the threaded holes of the tongue.

3. The clipless pedal as claimed in claim 1, wherein the board of the pedal body includes two ridges respectively extending from two sides of the body to restrict movement of the base of the clip.

4. The clipless pedal as claimed in claim 3, wherein the engaging member includes a plate connected to the base, two bores are defined through the plate, two locking members extend through the two bores and connect the engaging member to the base, two legs extending from one of two ends of the plate and a bridge is formed between the two legs so as to form an opening between the two legs and the bridge, the bridge extends upward and inclinedly relative to the plate, the opening is adapted to be engaged with a cleat.

5. The clipless pedal as claimed in claim 4, wherein two protrusions extend upward from another one of the two ends of the plate, the two protrusions extend toward the stop.

6. The clipless pedal as claimed in claim 5, wherein the base includes a surface which has multiple threaded holes, the locking members are connected to the threaded holes of the surface from one direction, the second bolts are connected to the threaded holes of the surface from a direction opposite to the direction that the locking members are connected to the surface, so that the base is fixed between the engaging member and the board of the pedal body, the room is located next to the surface and located between two side frames, a first extension is located at the first end of the base and formed between the two side frames, two sink holes and a receiving holes are defined through the first extension, the first bolts extend through the sink hole and are connected to the threaded holes of the tongue, an adjustable bolt extends through the receiving holes and is connected to a second flange on the first end of the base.

* * * * *